April 8, 1969     W. F. NETUSIL ET AL     3,436,966
ROCKET ENGINE GAS SAMPLING SYSTEM
Filed Nov. 7, 1967
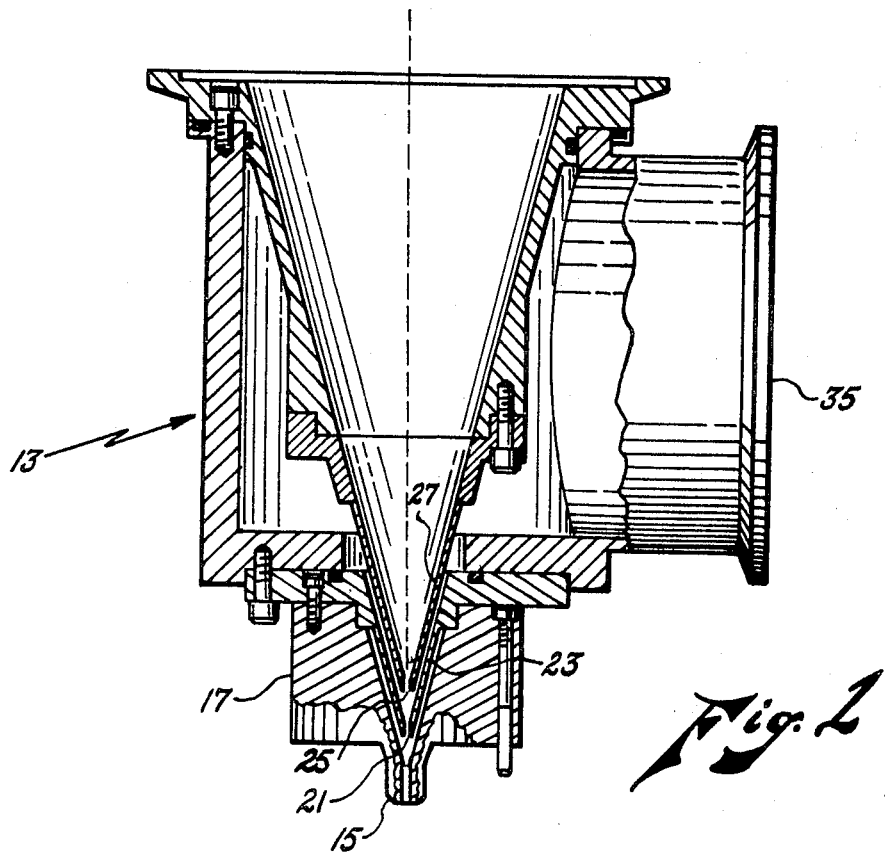
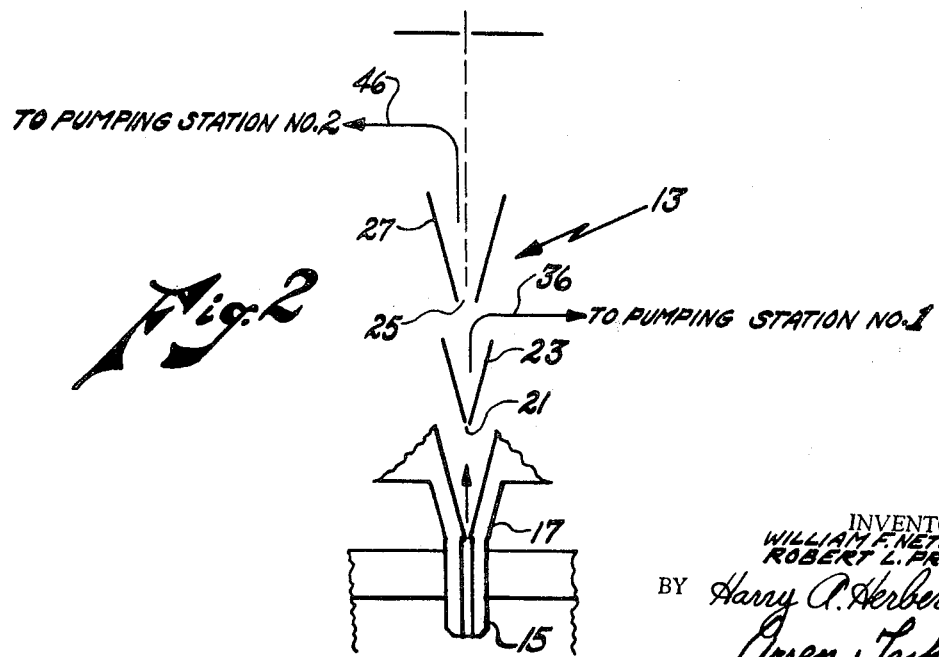
INVENTORS
WILLIAM F. NETUSIL
ROBERT L. PROFFIT
BY Harry A. Herbert Jr.
Orsen Tashjian and
ATTORNEYS United States Patent Office 3,436,966
Patented Apr. 8, 1969

3,436,966
ROCKET ENGINE GAS SAMPLING SYSTEM
William F. Netusil, Woodland Hills, and Robert L. Proffit, Chatsworth, Calif., assignors to the United States of America as represented by the Secretary of the Air Force
Filed Nov. 7, 1967, Ser. No. 681,299
Int. Cl. G01n 1/22
U.S. Cl. 73—421.5               5 Claims

ABSTRACT OF THE DISCLOSURE

A gas sampling system having a differentially pumped gas inlet probe including a tip through which the combustion gases from a rocket engine chamber are extracted and quenched to effectively prevent any further reaction thereof. First and second skimmers located in the inlet probe operate with associated vacuum pumps to transform the gases into a molecular beam which is then fed into the ionization chamber of a time-of-flight mass spectrometer for analysis.

---

This invention relates to a system for identifying the combustion products of a rocket engine and, more particularly, the invention is concerned with a system for extracting the combustion products from the chamber of the engine and preventing further reaction while the gases are ionized and fed into a time-of-flight mass spectrometer.

Analysis of the combustion processes important in rocket propulsion requires a knowledge of the products formed in the combustion chamber, nozzle, and exhaust stream of the rocket engine. Also required is a knowledge of the thermodynamic properties of the propellants and their combustion products.

The most difficult of the problems solved by the hereinafter described system for the identification of rocket combustion products is the obtaining of information on the products formed in the combustion chamber. A unique sampling probe having a differentially pumped water-cooled gas inlet system is disclosed for extracting the combustion gases from the chamber. The sampling probe provides for the achievement of expansion quenching of chemical reactions and the high-temperature equilibrium composition of the combustion gases maintained. A molecular beam of the gas sample is formed which is then introduced into the ionization chamber of a time-of-flight mass spectrometer. In this spectrometer, mass separation is achieved through differences in drift time of species down a tube. The time differences can be displayed on a cathode-ray oscilloscope or recorded on a galvanometer oscillograph.

Accordingly, it is an object of the present invention to provide a gas sampling system especially suitable for use with rocket engines to analyze the combustion products therefrom.

Another object of the invention is to provide a gas sampling device especially adapted for supplying a gas sample to the ionization chamber of a time-of-flight mass spectrometer.

Still another object of the invention is to provide a gas sampling probe arrangement wherein rapid cooling of the high-temperature gas species is accomplished to prevent further reaction from taking place after leaving the combustion chamber.

A further object of the invention is to provide a gas sampling system having a probe adapted for insertion into the combustion chamber of a rocket engine. The probe operates to provide the input to a differentially pumped molecular inlet system.

A still further object of the invention is to provide a gas sampling system having three stages of differential pumping and orificing and a final fourth-stage slit entrance to the ionization chamber of a time-of-flight mass spectrometer.

These and other objects, features and advantages will become more apparent after considering the following detailed description taken in conjunction with the illustrative embodiment in the accompany drawings wherein:

FIGURE 1 is a cross-sectional view of gas sampling system assembly showing the details of the probe tip;

FIGURE 2 is a schematic representation of the gas flow through the sampling system.

Figure 3:
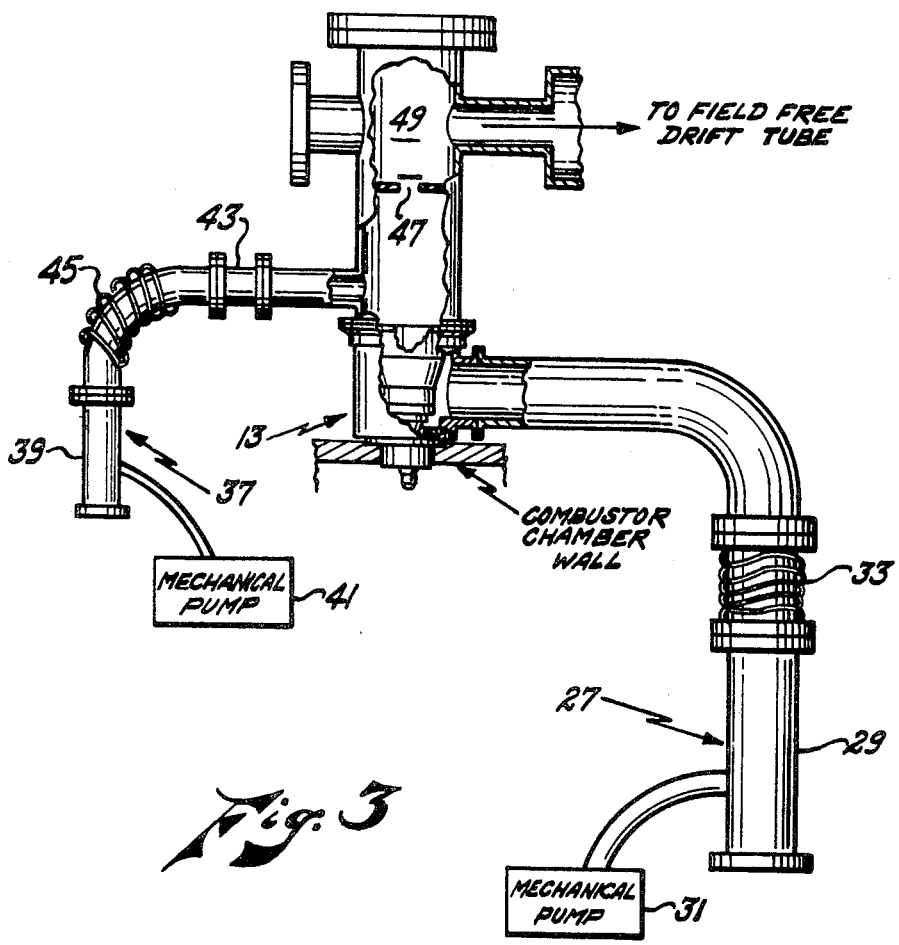
FIGURE 3 is a diagrammatic view of the gas sampling system with associated equipment showing the operation as a combustion product analyzer.

Referring now to the drawings wherein like reference characters refer to like structural elements in the several views, the gas sampling apparatus of the invention includes a probe section generally designated by the reference numeral 13. At the lower end of the probe section 13, there is disposed a probe tip 15 in a probe tip housing 17. The critical portion of the sampling system is the probe tip 15 because it is exposed to, and must endure, the quenching of the hot combustion gases. In a preferred embodiment of the invention, the probe tip 15 consists of a copper cylinder 0.100 inch in diameter and 0.375 inch long with a rectangular slot 0.030 x 0.003 x 0.375 inch long. This tip 15 is cooled by a highly turbulent water flow (not shown).

Phenomenologically, there is a flow of gas from the combustion chamber area at a temperature of 4000° F. and a pressure of 500 p.s.i. through the rectangular slot in the probe tip 15 to a region where the pressure is slightly below that of the atmosphere. A mechanical vacuum pump (not shown) operates to ensure that the exit pressure in the region of the probe exit is maintained below atmospheric. As the gases pass through the slot, a high degree of cooling will take place because of radiative and convective heat transfer to the slot walls and the probe tip housing 17. These heat losses determined by order-of-magnitude calculations indicate that the gas species is taken from the chamber pressure and temperatures noted above to atmospheric pressure and 500° F. in approximately 40 microseconds. The rapid cooling and pressure drop thus obtained is sufficient to freeze the reaction so that the sample will be representative of the combustor gases.

After the gas leaves the probe tip 15, it flows through a first skimmer port 21 in the first skimmer section 23 and then through a second skimmer port 25 in the second skimmer section 27. These skimmer sections 23 and 27 are of conical configuration and serve to transform the gas leaving the probe tip 15 into a molecular beam. In a typical gas sampling system according to the invention, the diameter of the entrance port 21 of the first skimmer section 23 is 0.003 inch. The diameter of the second skimmer port 25 is 0.010 inch. The distance between the first and second skimmers is 0.375 inch.

The ideal port diameters of the skimmers as hereinbefore stated is determined by considering the pumping capacities of the associated vacuum systems. The pumping station number one is designated by the reference numeral 27 and includes a mercury diffusion pump 29 backed by a mechanical pump 31 to ensure maximum diffusion pump speeds. Back streaming of mercury is prohibited by the water-cooled baffle 33. The pumping station one is attached to the system at the pumping port 35 (FIGURE 1) and maintains a negative pressure between the first and second skimmers. This arrangement is shown schematically in FIGURE 2 by the arrow 36.

Pumping station number two is designated by the reference numeral 37 and includes the oil diffusion pump 39 backed by a mechanical pump 41. Other necessary equipment for reducing the pressure behind skimmer number two to the required value include a close-coupled chevron baffle 43 coupled to the pump 39 by the water-cooled copper elbow 45. The arrow 46 in FIGURE 2 schematically shows the arrangement of the pump station two in relation to the skimmers.

In operation for determining the products forms in the combustion chamber of a rocket engine, the gas sampling system according to the invention is attached to the engine by inserting the probe tip 15 through the combustion chamber wall into the combustion chamber. The tip is water-cooled and a mechanical vacuum pump operates to maintain the exit pressure below atmospheric to reduce the stay time of the gases in the tip in order to more effectively prevent further reaction of the combustor gases after leaving the chamber. The gas leaves the probe tip 15 and flows through two skimmer sections 23 and 27 where it is formed into a molecular beam which is then fed through an isolation valve 47 into the ionization chamber 49 of a time-of-flight mass spectrometer.

The time-of-flight mass spectrometer particularly suitable for use with the unique gas sampling probe hereinbefore disclosed would consist of the ionization chamber 49; extraction, beam-forming, and accelerator electrodes; field-free drift tube; target; electron multiplier; and a wideband amplifier. A gas sample of unknown composition would be introduced into the ionization chamber 49 where it is subjected to electron bombardment. Because of the electron energies used, one or more electrons can be driven from the outer atomic orbit thus giving rise to singly or multiply charged ions. The ions are then extracted in batches from the ionization chamber by electrically pulsing the extraction electrode, formed into a beam, and accelerated down a field-free tube toward a target. Separation of the batch on the basis of mass-to-charge ratio is accomplished in the drift tube because lighter species drift to the target faster than the heavier ones.

As each bunch of mass-to-charge ratios (ions) strikes the collector cathode, the ions cause secondary emission of electrons which enter an electron multiplier. The electron multiplier generates a voltage pulse at its anode for each ion bunch that strikes the collector. The amplitude of this pulse is directly proportional to the number of ions of a particular mass-to-charge ratio. The pulses are then amplified and drive the vertical deflection plates of a cathode-ray oscilloscope. The horizontal deflection plates are driven by a linearly increasing voltage to obtain a time base. The time base, representing drift time, is then a mass-to-charge ratio scale. Thus, the scope presentation is a distribution of relative quantity of each species present in the original sample.

Although the invention has been illustrated in the accompanying drawings and described in the foregoing specification in terms of a preferred embodiment thereof, the invention is not limited to this embodiment or to the particular uses mentioned. It will be apparent to those skilled in the art that our invention can be practiced by utilizing the disclosed gas sampling system with any source of unknown gaseous substance, particularly at elevated temperatures. The disclosed system is especially useful as a tool for experimental investigations of thermodynamic equilibria at ambient as well as at the higher temperatures. Also, the entire system is remotely controllable to ensure safety during operation when used in conjunction with a rocket engine.

Having thus described our invention, what we claim and desire to secure by Letters Patent of the United States is:

1. A gas sampling system for extracting gaseous combustor products from the chamber of a rocket engine or the like, said system comprising a probe housing having a conically shaped depression therein, a probe tip extending outwardly from and attached at the apex of the conical depression, said probe tip having a nose portion extending into rocket engine chamber and having a passageway therethrough, means for cooling gases entering the passageway in said probe tip, a first hollow conical skimmer positioned in the conical depression in said probe housing and spaced therefrom to form a first continuous annular space therebetween, a second hollow conical skimmer positioned within and spaced from said first conical skimmer to form a second continuous annular space therebetween, first vacuum pump means in communication with said second continuous annular space for maintaining a negative pressure therein, second vacuum pump means in communication with the interior of said second hollow skimmer for maintaining a negative pressure therein, each of said skimmers having a small openings at each of the apexes thereof to allow gas molecules to flow therethrough, the flowing gas thereby forming a molecular beam, and an ionization chamber positioned downstream from said skimmers to receive the molecular beam for presentation and analysis in a mass spectrometer positioned adjacent thereto.

2. The gas sampling system defined in claim 1, wherein the passageway through the nose portion of said probe tip is rectangular in configuration to obtain optimum pressure and temperature drop during the passage of gaseous products therethrough.

3. The gas sampling system defined in claim 1, wherein the size of the openings in the apexes of said first and second skimmers is in the ratio of three to ten.

4. The gas sampling system defined in claim 1, wherein the annular space between said first and second skimmers is 3.75 times the diameter of the opening in the apex of said second skimmer.

5. The gas sampling system defined in claim 1, wherein the negative pressure maintained in the interior of said second skimmers is substantially lower than the negative pressure in the area between the first and second skimmers thereby maintaining molecular flow through the sampling system.

References Cited

UNITED STATES PATENTS

| 2,721,270 | 10/1955 | Bennett. |
| 3,011,336 | 12/1961 | Weiss _____ 73—42.5 X |

FOREIGN PATENTS

| 1,418,068 | 10/1965 | France. |

S. CLEMENT SWISHER, *Primary Examiner.*

U.S. Cl. X.R.

250—41.9